(12) United States Patent
Oguma et al.

(10) Patent No.: US 11,070,156 B2
(45) Date of Patent: Jul. 20, 2021

(54) POWER SYSTEM

(71) Applicant: Honda Motor Co., Ltd., Tokyo (JP)

(72) Inventors: Hirokazu Oguma, Saitama (JP); Naoto Tagaya, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 4 days.

(21) Appl. No.: 16/824,711

(22) Filed: Mar. 20, 2020

(65) Prior Publication Data

US 2020/0313595 A1 Oct. 1, 2020

(30) Foreign Application Priority Data

Mar. 26, 2019 (JP) .............................. JP2019-058112

(51) Int. Cl.
| | |
|---|---|
| *H02P 1/00* | (2006.01) |
| *H02P 3/00* | (2006.01) |
| *H02P 5/00* | (2016.01) |
| *H02P 23/14* | (2006.01) |
| *H02P 27/08* | (2006.01) |
| *B60K 1/04* | (2019.01) |
| *B60K 6/28* | (2007.10) |

(52) U.S. Cl.
CPC ............. *H02P 23/14* (2013.01); *H02P 27/08* (2013.01); *B60K 1/04* (2013.01); *B60K 6/28* (2013.01); *B60Y 2200/91* (2013.01); *B60Y 2200/92* (2013.01); *B60Y 2400/61* (2013.01); *H02P 2205/03* (2013.01)

(58) Field of Classification Search
CPC .................................. H02P 23/14; H02P 27/08

USPC ...................................................... 318/139
See application file for complete search history.

(56) References Cited

U.S. PATENT DOCUMENTS

| | | | | |
|---|---|---|---|---|
| 2015/0306960 A1* | 10/2015 | Sobu | ....................... | H02M 1/44 307/10.1 |
| 2015/0352968 A1* | 12/2015 | Date | ....................... | B60L 53/00 307/10.1 |
| 2018/0287494 A1* | 10/2018 | Yano | ...................... | H02M 3/158 |
| 2019/0359078 A1* | 11/2019 | Yamada | .................. | B60L 53/60 |
| 2020/0298710 A1* | 9/2020 | Masaki | ................. | H02P 29/028 |

FOREIGN PATENT DOCUMENTS

JP 2017169311 9/2017

* cited by examiner

*Primary Examiner* — Erick D Glass
(74) *Attorney, Agent, or Firm* — JCIPRNET

(57) ABSTRACT

A power system includes: a first power circuit, having a first battery; a second power circuit, having a second battery, wherein a used voltage range of the second battery with respect to a closed circuit voltage overlaps with the first battery, and a static voltage of the second battery is lower than the first battery; a voltage converter, converting a voltage between the power circuits; a power converter, converting power between the first power circuit and a driving motor; and a management ECU and a motor ECU, operating the power converter based on required power. The management ECU and the motor ECU calculates limit power with respect to output power of the first battery based on an internal state of the second battery, and operates the power converter so that the output power of the first battery does not exceed the limit power.

4 Claims, 8 Drawing Sheets

POWER SYSTEM

CROSS-REFERENCE TO RELATED APPLICATION

This application claims the priority of patent Japan application serial no. 2019-058112, filed on Mar. 26, 2019. The entirety of the above-mentioned patent application is hereby incorporated by reference herein and made a part of this specification.

BACKGROUND

Technical Field

The disclosure relates to a power system. More specifically, the disclosure relates to a power system including a high voltage power source and a low voltage power source whose used voltage ranges with respect to closed circuit voltages overlap.

Description of Related Art

In recent years, electric vehicles such as electric conveying machines including driving motors as power generating source, hybrid vehicles including driving motors and internal combustion engines as power generating source, etc., are undergoing progressive development. In such an electric vehicle, a power apparatus such as a power storage device (battery, capacitor, etc.), a fuel cell, etc., is mounted to supply electric energy to the driving motor. Also, in recent years, an electric vehicle in which a plurality of power apparatuses having different characteristics is also under development.

Patent Document 1 (Japanese Laid-Open No. 2017-169311) discloses a power system of an electric vehicle. The power system includes: a power circuit connecting a driving part, which is formed by a driving motor, an inverter, etc., and a first power storage device; a second power storage device connected with the power circuit via a voltage converter; and a control apparatus exerting switching control on the voltage converter. The control device sets a target current with respect to a passing current that is a current passing through the voltage converter in response to a driver's request, exerts switching control of the power converter so that the passing current becomes the target current, combines power output from the first power storage device and power output from the second power storage device, and supplies the combined power to the driving motor.

As in the power system, in the case where two power storage devices are connected by the voltage converter, the power output from the second power storage device is basically controllable by the switching control of the voltage converter. However, when the driving motor requires great power during acceleration, for example, the current flowing through the first power storage device may increase, and the closed circuit voltage of the first power storage device may be lower than the static voltage of the second power storage device. In such case, the second power storage device may start to discharge, and a current may unintentionally flow through the voltage converter from the side of the second power storage device to the side of the first power storage device.

The disclosure provides a power system capable of suppressing unintentional discharging from a low voltage power source in a voltage converter connecting the low voltage power source and a high voltage power source.

SUMMARY

A power system according to an aspect of the disclosure (e.g., the power system 1 described afterwards) includes: a high voltage circuit (the first power circuit 2 described afterwards) having a high voltage power source (e.g., the first battery B1 described afterwards); a low voltage circuit (the second power circuit 3 described afterwards) having a low voltage power source (e.g., the second battery B2 described afterwards), wherein a used voltage range of the low voltage power source with respect to a closed circuit voltage overlaps with the high voltage power source, and a static voltage of the low voltage power source is lower than the high voltage power source; a voltage converter (e.g., the voltage converter 5 described afterwards), converting a voltage between the high voltage circuit and the low voltage circuit; a power converter (e.g., the power converter 43 described afterwards), converting power between the high voltage circuit and a driving motor (e.g., the driving motor M described afterwards); a required power obtaining section (e.g., the management ECU 71 and the pedal type P described afterwards), obtaining required power in the driving motor; a power control section (e.g., the management ECU 71, the motor ECU 72, and the converter ECU 73 described afterwards), operating the power converter based on the required power; and a state obtaining section (e.g., the second battery ECU 75 and the second battery sensor unit 82 described afterwards), obtaining a state of the low voltage power source. The power control section calculates a limit power (e.g., the limit power Pmax described afterwards), which is an upper limit with respect to output power of the high voltage power source, based on a state of the low voltage power source, and operates the power converter so that the output power of the high voltage power source does not exceed the limit power.

According to an embodiment of the disclosure, the state obtaining section obtains a temperature (e.g., the temperature T described afterwards) of the low voltage power source, and in a case where the temperature of the low voltage power source is higher than a predetermined temperature (e.g., the high-temperature power save temperature Tps described afterwards), the power control section calculates the limit power so that a closed circuit voltage of the high voltage power source is equal to or higher than the static voltage of the low voltage power source.

According to an embodiment of the disclosure, the low voltage power source is a power storage device capable of charging and discharging, the state obtaining section obtains a power storage parameter (e.g., the charging rate SOC described afterwards) that increases in response to a power storage of the low voltage power source, and the power control section calculates the limit power so as to be smaller in a case where the power storage device is less than or equal to a predetermined threshold than in a case where the power storage device is greater than the predetermined threshold.

According to an embodiment of the disclosure, the power control section calculates the limit power, so that a closed circuit voltage of the high voltage power source is equal to or higher than a predetermined lower limit voltage, sets a lower limit of a used voltage range of the high voltage power source as the lower limit voltage in a case where the power storage parameter is greater than a first threshold, and sets a lowest voltage, which is a static voltage of the low voltage power source when the power storage of the low voltage power source is at a predetermined power limit, as the lower limit voltage in a case where the power storage parameter is equal to or lower than a second threshold smaller than the first threshold, and the lowest voltage is higher than the lower limit of the used voltage range of the high voltage power source.

Figure 1:
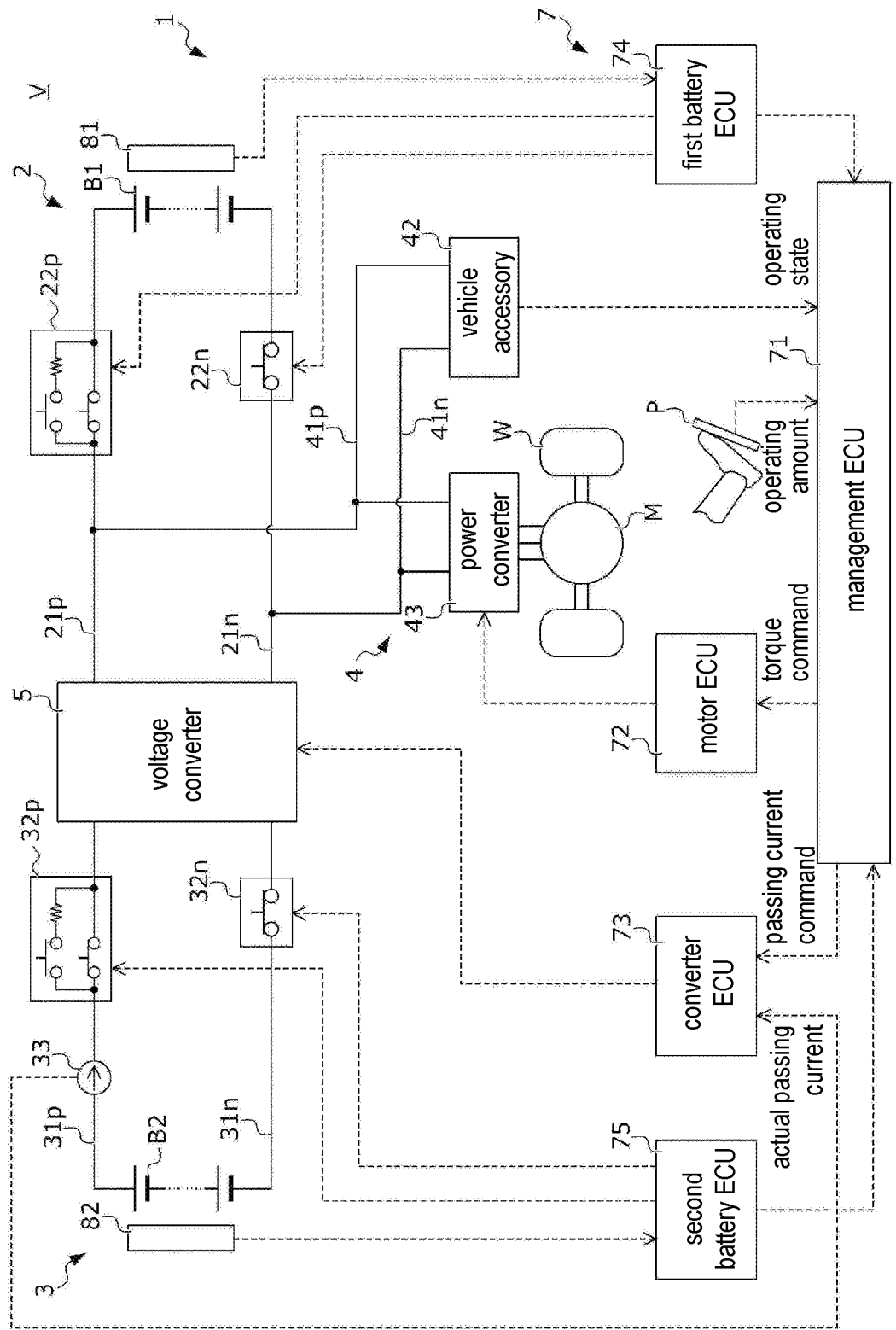
FIG. 1 is a diagram illustrating a configuration of a vehicle in which a power system according to a first embodiment of the disclosure is mounted.

DESCRIPTION OF THE EMBODIMENTS (1) In the power system of the disclosure, the high voltage circuit and the low voltage circuit are connected by the voltage converter, and the high voltage circuit and the driving motor are connected by the power converter. The high voltage circuit has the high voltage power source. The low voltage circuit has the low voltage power source. The used voltage range of the low voltage power source with respect to the closed circuit voltage overlaps with the high voltage power source, and the static voltage of the low voltage power source is lower than the high voltage power source. The power control section operates the power converter based on the required power in the driving motor. In such power system, when the required power increases in response to an acceleration requirement, the power control section operates the power converter so that the output power responsive to the required power is supplied from the power converter to the driving motor, and the power output from the high voltage power source and the power output from the low voltage power source are combined. Here, in the case where discharging of the low voltage power source is to be prohibited or suppressed for some reason, the power control section operates the voltage converter or the power converter so that the entirety or majority of the required power is covered by the power output from the high voltage power source. However, when the used voltage ranges of the high voltage power source and the low voltage power source overlap, the required power increases, and when the current flowing through the high voltage power source increases, the closed circuit voltage of the high voltage power source may become lower than the static voltage of the low voltage power source, and power may unintentionally output from the low voltage power source. Comparatively, in the disclosure, the state obtaining section obtains the state of the low voltage power source, and the power control section calculates the limit power with respect to the output power of the high voltage power source based on the state of the low voltage power source, and operates the power converter so that the output power of the high voltage power source does not exceed the limit power. Therefore, according to the disclosure, since the power output from the high voltage power source can be limited in response to the state of the low voltage power source, the unintentional discharging from the low voltage power source can be suppressed.

(2) When the power source discharges in a high temperature state, there are concerns that the power source may deteriorate. Comparatively, in the disclosure, in the case where the temperature of the low voltage power source is higher than the predetermined temperature, the power control section calculates the limit power so that the closed circuit voltage of the high voltage power source is equal to or higher than the static voltage of the low voltage power source. In this way, in the case where the temperature of the high voltage power source is higher than the predetermined temperature, since the output power of the high voltage power source is limited so that the closed circuit voltage of the high voltage power source is equal to or higher than the static voltage of the low voltage power source, the deterioration of the low voltage power source can be suppressed.

(3) In the disclosure, the power control section calculates the limit power so as to be smaller in the case where the power storage parameter of the low voltage power source, which is a power storage device, is less than or equal to the threshold than the case where the power storage parameter is greater than the predetermined threshold. In other words, the power control section reduces the limit power in accordance with the decrease in the power storage of the low voltage power source. Therefore, according to the disclosure, in the case where the power storage of the low voltage power source is sufficient, the power output from the high voltage power source and the power output from the low voltage power source can be combined, and the power responsive to the required power can be supplied to the driving motor, and in the case where the power storage of the low voltage power source is insufficient, the decrease in the power storage of the low voltage power source can be suppressed.

(4) In the disclosure, the power control section calculates the limit power, so that the closed circuit voltage of the high voltage power source is equal to or higher than the predetermined lower limit voltage, and sets the lower limit of the used voltage range of the high voltage power source as the lower limit voltage in the case where the power storage parameter is greater than the first threshold. Accordingly, in the case where the power storage of the low voltage power source is sufficient, since the outputs of the power from the high voltage power source and the low voltage power source can be allowed, the power responsive to the required power can be supplied to the driving motor. In addition, the power control section sets the lowest voltage, which is the static voltage of the low voltage power source when the static voltage is higher than the lower limit of the used voltage range of the high voltage power source and the power storage of the low voltage power source is at the predetermined lower limit, in the case where the power storage parameter is equal to or lower than the second threshold. Accordingly, in the case where the power storage of the low voltage power source is insufficient, the output of the power from the low voltage power source can be suppressed, and the power storage thereof can be prevented from going lower than the lower limit.

First Embodiment

In the following, the first embodiment of the disclosure will be described with reference to the drawings. FIG. 1 is a diagram illustrating a configuration of an electric vehicle V (hereinafter simply referred to as "vehicle") in which a power system 1 according to the embodiment is mounted.

The vehicle V includes a driving wheel W, a driving motor M connected with the driving wheel W, and a power system 1 for power transfer between the driving motor M and a first battery B1 and a second battery B2 to be described afterwards. The embodiment is described with an example in which the vehicle V accelerates/decelerates mainly based on the power generated by the motor M. However, the disclosure is not limited thereto. The vehicle V may also be a so-called hybrid vehicle in which the driving motor M and an engine are mounted as power generating sources. In addition, in the embodiment, the power system 1 is described with an example of running by supplying power stored in the two batteries B1 and B2 to the driving motor M. However, the disclosure is not limited thereto. Any of the two batteries B1 and B2 which the power system 1 includes may also be a fuel cell.

The driving motor M is connected with the driving wheel W via a power transmission mechanism not shown herein. A torque generated by the driving motor M through supplying three-phase AC power from the power system 1 to the driving motor M is transmitted to the driving wheel W via the power transmission mechanism not shown herein, and the driving wheel W rotates to allow the vehicle V to travel. In addition, the driving motor M functions as a power generator to generate regenerative power when the vehicle V decelerates, and applies a regenerative braking torque responsive to the magnitude of the regenerative power to the driving wheel W. The regenerative power generated by the driving motor M properly charges the batteries B1 and B2 of the power system 1.

The power system 1 includes a first power circuit 2 having the first battery B1, a second power circuit 3 having the second battery B2, a voltage converter 5 connecting the first power circuit 2 and the second power circuit 3, a load circuit 4 having various electric loads including the driving motor M, and an electronic control unit group 7 controlling the first power circuit 2 and the second power circuit 3 and the load circuit 4 and the voltage converter 5. The electronic control unit group 7 includes a management ECU 71, a motor ECU 72, a converter ECU 73, a first battery ECU 74, and a second battery ECU 75, which are respectively computers.

The first battery B1 is a secondary battery capable of both discharging to convert chemical energy into electrical energy and charging to convert electrical energy into chemical energy. In the following, a case where a so-called lithium ion battery performing charging and discharging through movement of lithium ions between electrodes serves as the first battery B1 is described. However, the disclosure is not limited thereto.

In the first battery B1, a first battery sensor unit 81 is disposed to estimate an internal state of the first battery B1. The first battery sensor unit 81 is formed by a plurality of sensors which detect physical quantities necessary for obtaining the charging rate (which represents battery power storage in percentage), temperature, etc., of the first battery B1 in the first battery ECU 74, and transmit signals responsive to the detected values to the first battery ECU 74. More specifically, the first battery sensor unit 81 is formed by a voltage sensor detecting a terminal voltage of the first battery B1, a current sensor detecting a current flowing through the first battery B1, and a temperature sensor detecting a temperature of the first battery B1, etc.

The second battery B2 is a secondary battery capable of both discharging to convert chemical energy into electrical energy and charging to convert electrical energy into chemical energy. In the following, a case where a so-called lithium ion battery performing charging and discharging through movement of lithium ions between electrodes serves as the second battery B2 is described. However, the disclosure is not limited thereto. A capacitor, for example, may also be used as the second battery B2.

In the second battery B2, a second battery sensor unit 82 is disposed to estimate an internal state of the second battery B2. The second battery sensor unit 82 is formed by a plurality of sensors which detect physical quantities necessary for obtaining the charging rate, temperature, etc., of the second battery B2 in the second battery ECU 75 and transmit signals responsive to the detected values to the second battery ECU 75. More specifically, the second battery sensor unit 82 is formed by a voltage sensor detecting a terminal voltage of the second battery B2, a current sensor detecting a current flowing through the second battery B2, and a temperature sensor detecting a temperature of the second battery B2, etc.

Here, the characteristics of the first battery B1 and the characteristics of the second battery B2 are compared. Compared with the second battery B2, the first battery B1 has a lower output weight density and a higher energy weight density. In addition, the first battery B1 has a greater capacity than the second battery B2. In other words, the first battery B1 is excellent over the second battery B2 in terms of energy weight density. The energy weight density refers to electric energy per unit weight [Wh/kg], and the output weight density refers to electric power per unit weight [W/kg]. Therefore, the first battery B1 whose energy weight density is excellent is a capacity-type power storage device whose main purpose is to provide a high capacity, and the second battery B2 whose output weight density is excellent is an output-type power storage device whose main purpose is to provide a high output. Therefore, in the power system 1, the first battery B1 is used as main power source, and the second battery B2 is used as an auxiliary power source that supplements the first battery B1.

Figures 2A, 2B:
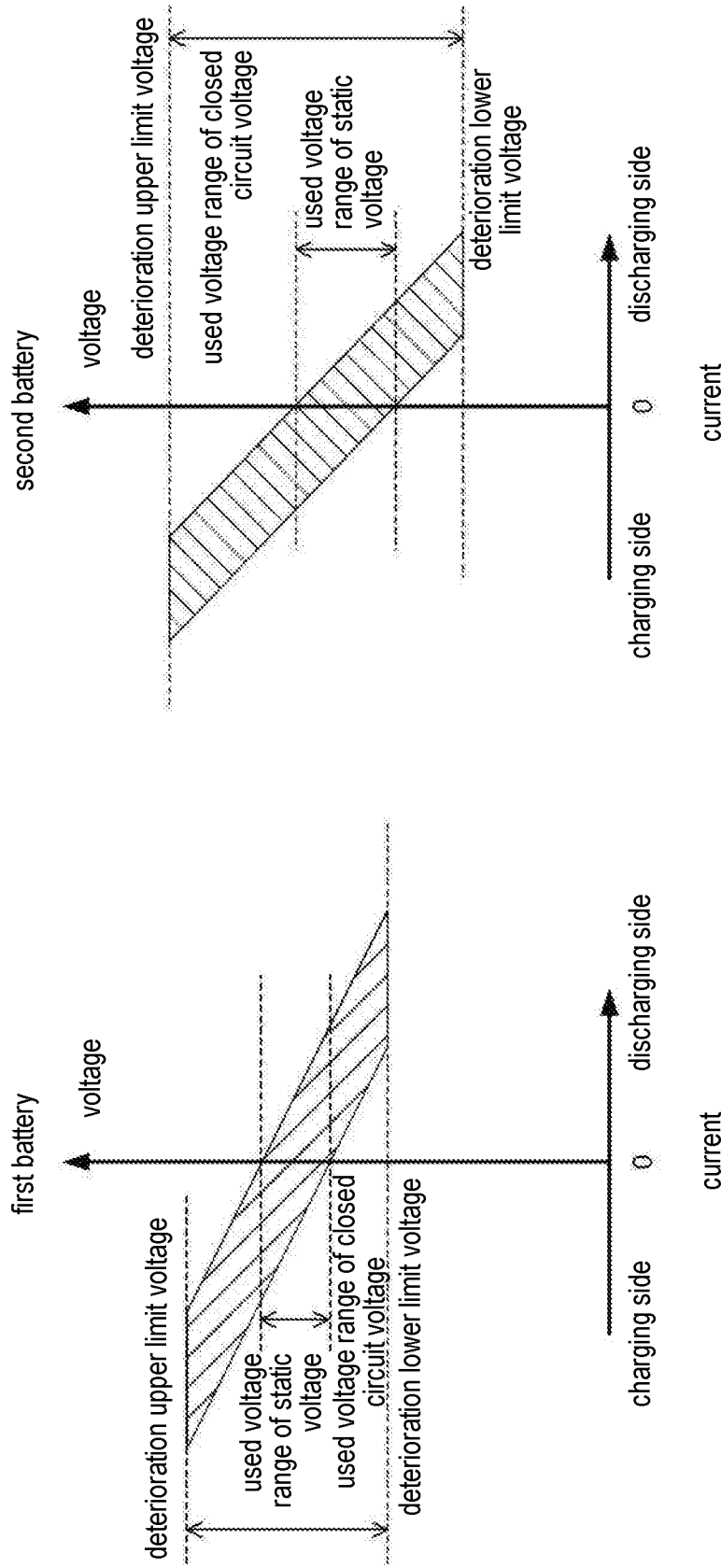
FIGS. 2A and 2B is a diagram comparing used voltage ranges of a first battery and a second battery.

FIGS. 2A and 2B are diagrams comparing used voltage ranges of the first battery B1 and the second battery B2 in the power system 1. FIG. 2A shows the used voltage range of the first battery B1, and FIG. 2B shows the used voltage range of the second battery B2. In FIGS. 2A and 2B, the horizontal axis represents the current flowing through the battery, and the vertical axis represents the voltage of the battery.

As shown in FIGS. 2A and 2B, the static voltages of the batteries B1 and B2 (i.e., voltages in a state in which currents do not flow through the batteries, such voltages may also be referred to as open circuit voltages) exhibit the characteristic of increasing as the charging rate increases. Therefore, the upper limits of the used voltage ranges of the batteries B1 and B2 with respect to the static voltages are the respective static voltages when the charging rate is at the maximum (e.g., 100%), and the lower limits thereof are the respective static voltages when the charging rate is at the minimum (e.g., 0%). As shown in FIGS. 2A and 2B, the upper limit of the used voltage range of the second battery B2 with respect to the static voltage is lower than the upper limit of the used voltage range of the first battery B1 with respect to the static voltage. Therefore, when the vehicle V is traveling, the static voltage of the second battery B2 is basically maintained lower than the static voltage of the first battery B1.

As shown in FIGS. 2A and 2B, the closed circuit voltages of the batteries B1 and B2 (i.e., voltages in a state in which currents flow into the batteries) also exhibit the characteristic of increasing as the charging rate increases. In addition, due to presence of internal resistances in the batteries B1 and B2, the closed circuit voltages exhibit the characteristics of decreasing from the static voltage as the discharging current increases and increasing from the static voltage as the charging current increases. Therefore, the upper limits of the used voltage ranges of the batteries B1 and B2 with respect to the closed circuit voltages are higher than the upper limits of the respective used voltage ranges thereof with respect to the static voltages, and the lower limits thereof are lower than the lower limits of the used voltage ranges of the respective static voltages. In other words, the used voltage ranges of the batteries B1 and B2 with respect to the closed circuit voltages include the respective used voltage ranges with respect to the static voltages. As shown in FIGS. 2A and 2B, the used voltage range of the first battery B1 with respect to the closed circuit voltage overlaps with the used voltage range of the second battery B2 with respect to the closed circuit voltage.

In addition, since the deterioration of the batteries B1 and B2 is facilitated when the charging current becomes excessively large, the upper limits of the used voltage ranges of the batteries B1 and B2 with respect to the closed circuit voltage are determined based on the states of the batteries B1 and B2 so as not to deteriorate the batteries B1 and B2. In the following, the upper limits of the used ranges of the closed circuit voltages of the batteries B1 and B2 are also referred to as deterioration upper limit voltages.

In addition, since the deterioration of the batteries B1 and B2 is facilitated when the discharging current becomes excessively large, the lower limits of the used voltage ranges of the batteries B1 and B2 with respect to the closed circuit voltage are determined based on the states of the batteries B1 and B2 so as not to deteriorate the batteries B1 and B2. In the following, the lower limits of the used voltage ranges of the batteries B1 and B2 with respect to the closed circuit voltages are also referred to as deterioration lower limit voltages.

Referring to FIG. 1 again, the first power circuit 2 includes the first battery B1, first power lines $21p$ and $21n$ connecting positive and negative electrodes of the first battery B1 and a positive electrode terminal and a negative electrode terminal of a high voltage side of the voltage converter 5, and a positive electrode contactor $22p$ and a negative electrode contactor $22n$ provided at the first power lines $21p$ and $21n$.

The contactors $22p$ and $22n$ are of a normal-open type that are opened in a state in which a command signal from the outside is not input, so as to cut off conduction between the two electrodes of the first battery B1, and the first power lines $21p$ and $21n$, and are closed in a state in which the command signal is input, so as to connect the first battery B1 and the first power lines $21p$ and $21n$. The contactors $22p$ and $22n$ are opened and closed responsive to a command signal transmitted from the first battery ECU 74. The positive electrode contactor $22p$ is configured as a pre-charge contactor having a precharge resistance for smoothing a rush current to a plurality of smoothing capacitors disposed in the first power circuit 2 or the load circuit 4, etc.

The second power circuit 3 includes the second battery B2, second power lines $31p$ and $31n$ connecting positive and negative electrodes of the second battery B2 and a positive electrode terminal and a negative electrode terminal of a low voltage side of the voltage converter 5, a positive electrode contactor $32p$ and a negative electrode contactor $32n$ provided at the second power lines $31p$ and $31n$, and a current sensor 33 provided at the second power line $31p$.

The contactors $32p$ and $32n$ are of a normal-open type that are opened in a state in which a command signal from the outside is not input, so as to cut off conduction between the two electrodes of the second battery B2 and the second power lines $31p$ and $31n$, and are closed in a state in which the command signal is input, so as to connect the second battery B2 and the second power lines $31p$ and $31n$. The contactors $32p$ and $32n$ are opened and closed responsive to a command signal transmitted from the second battery ECU 75. The positive electrode contactor $32p$ is configured as a pre-charge contactor having a precharge resistance for smoothing a rush current to a plurality of smoothing capacitors disposed in the first power circuit 2 or the load circuit 4, etc.

The current sensor 33 transmits a detection signal responsive to a passing current, which is a current flowing through the second power line $31p$, i.e., a current flowing through the voltage converter 5, to the converter ECU 73. Regarding the direction of the passing current in the embodiment, the direction from the side of the second power circuit 3 toward the side of the first power circuit 2 is set as positive, and the direction from the side of the first power circuit 2 toward the side of the second power circuit 3 is negative.

The load circuit 4 includes a vehicle accessory 42, a power converter 43 connected with the driving motor M, and load power lines $41p$ and $41n$ connecting the vehicle accessory 42 and the power converter 43 with the first power circuit 2.

The vehicle accessory 42 is formed by a plurality of electrical loads such as a battery heater, an air compressor, a DC-DC converter, and a car charger, etc. The vehicle accessory 42 is connected with the first power lines $21p$ and $21n$ of the first power circuit 2 through the load power lines $41p$ and $41n$, and operates by consuming the power in the first power line $21p$ and $21n$. Information relating to operating states of the various electrical loads forming the vehicle accessory 42 is transmitted to the management ECU 71, for example.

The power converter 43 is connected with the first power lines $21p$ and $21n$ to be parallel to the vehicle accessory 42 through the load power lines $41p$ and $41n$. The power converter 43 converts power between the first power lines $21p$ and $21n$ and the driving motor M. The power converter 43, for example, includes a bridge circuit formed by bridge-connecting a plurality of switching elements (e.g., IGBT), is a PWM inverter with pulse width modulation, and includes a function of converting between DC power and AC power. The power converter 43 is connected with the first power lines $21p$ and $21n$ on DC input/output sides, and is connected with respective coils of a U phase, a V phase, and a W phase of the driving motor M on AC input/output sides. The power converter 43 converts DC power in the first power lines $21p$ and $21n$ into three-phase AC power and supplies the three-phase AC power to the driving motor and converts three-phase AC power supplied from the driving motor into DC power or converts three-phase AC power supplied by the driving motor M into DC power and supplies the DC power to the first power lines 21p and 21n by on/off driving the switching elements of the respective phases in accordance with a gate driving signal generated at a predetermined timing from a gate drive circuit (not shown) of the motor ECU 72.

The voltage converter 5 connects the first power circuit 2 and the second power circuit 3, and converts a voltage between the first power circuit 2 and the second power circuit 3. A conventional booster circuit may be used as the voltage converter 5.

Figure 3:
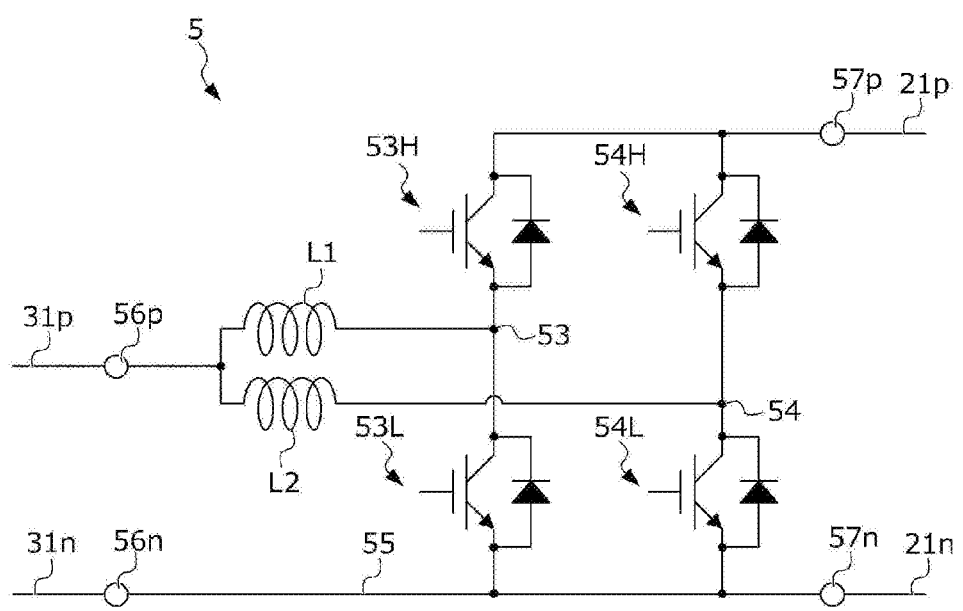
FIG. 3 is a diagram illustrating an example of a circuit configuration of a voltage converter.

FIG. 3 is a diagram illustrating an example of a circuit configuration of the voltage converter 5. The voltage converter 5 connects the first power lines 21p and 21n connected with the first battery B1 and the second power lines 31p and 31n connected with the second battery B2, and converts a voltage between the first power lines 21p and 21n and the second power lines 31p and 31n. The voltage converter 5 is a full-bridge type DC-DC converter formed by assembling a first reactor L1, a second reactor L2, a first high-arm element 53H, a first low-arm element 53L, a second high-arm element 54H, a second low-arm element 54L, a negative busbar 55, low voltage side terminals 56p and 56n, high voltage side terminals 57p and 57n, and a smoothing capacitor (not shown).

The low voltage side terminals 56p and 56n are connected with the second power lines 31p and 31n, and the high voltage side terminals 57p and 57n are connected with the first power lines 21p and 21n. The negative busbar 55 is a wiring connecting the low voltage side terminal 56n and the high voltage side terminal 57n.

One end side of the first reactor L1 is connected with the low voltage side terminal 56p, and the other end side thereof is connected with a connection node 53 between the first high-arm element 53H and the first low-arm element 53L. The first high-arm element 53H and the first low-arm element 53L each include a conventional power switching element such as an IGBT or a MOSFET, etc., and a freewheel diode connected with the power switching element. The high-arm element 53H and the low-arm element 53L are connected in series in this order between the high voltage side terminal 57P and the negative busbar 55.

The collector of the power switching element of the first high-arm element 53H is connected with the high voltage side terminal 57p, and the emitter thereof is connected with the collector of the first low-arm element 53L. The emitter of the power switching element of the first low-arm element 53 is connected with the negative busbar 55. The forward direction of the freewheel diode provided at the first high-arm element 53H is a direction from the first reactor L1 toward the high voltage side terminal 57p. In addition, the forward direction of the freewheel diode provided at the first low-arm element 53L is a direction from the negative busbar 55 toward the first reactor L1.

One end side of the second reactor L2 is connected with the low voltage side terminal 56p, and the other end side thereof is connected with a connection node 54 between the second high-arm element 54H and the second low-arm element 54L. The second high-arm element 54H and the second low-arm element 54L each include a conventional power switching element such as an IGBT or a MOSFET, etc., and a freewheel diode connected with the power switching element. The high-arm element 54H and the low-arm element 54L are connected in series in this order between the high voltage side terminal 57P and the negative busbar 55.

The collector of the power switching element of the second high-arm element 54H is connected with the high voltage side terminal 57p, and the emitter thereof is connected with the collector of the second low-arm element 54. The emitter of the power switching element of the second low-arm element 54L is connected with the negative busbar 55. The forward direction of the freewheel diode provided at the second high-arm element 54 is a direction from the second reactor L2 toward the high voltage side terminal 57p. In addition, the forward direction of the freewheel diode provided at the second first low-arm element 54L is a direction from the negative busbar 55 toward the second reactor L2.

The voltage converter 5 converts a voltage between the first power lines 21p and 21n and the second power lines 31p and 31n through alternately on/off driving the first high-arm element 53H as well as the second low-arm element 54L and the first low-arm element 53L as well the second high-arm element 54H in accordance with a gate driving signal generated at a predetermined timing from a gate drive circuit (not shown) of the converter ECU 73.

As described with reference to FIGS. 2A and 2B, when the vehicle V is traveling, the static voltage of the second battery B2 is basically maintained lower than the static voltage of the first battery B1. Accordingly, the voltages of the first power lines 21p and 21n are basically higher than the voltages of the second power lines 31p and 31n. Therefore, in the case where the power output from the first battery B1 and the power output from the second battery B2 are both used to drive the driving motor M, the converter ECU operates the voltage converter 5 so as to exert a booster function in the voltage converter 5. The booster function refers to a function to boost power in the second power lines 31p and 31n connected with the low voltage side terminals 56p and 56n to output the boosted power to the first power lines 21p and 21n connected with the high voltage side terminals 57p and 57n, thereby making a positive passing current flow from the side of the second power lines 31p and 31n to the side of the first power lines 21p and 21n. In addition, in the case where discharging of the second battery B2 is suppressed and the driving motor M is driven only by the power output by the first battery B1, the converter ECU 73 turns off the voltage converter 5, so that the current does not flow from the first power lines 21p and 21n to the second power lines 31p and 31n. However, under such circumstance, in the case where the voltages of the second power lines 31p and 31n exceed the voltages of the first power lines 21p and 21n, there is a situation where the second battery B2 starts to discharge, and the positive flowing circuit flows from the second power lines 31p and 31n to the first power lines 21p and 21n via the freewheel diodes of the high-arm elements 53H and 54H.

In addition, in the case where the first battery B1 or the second battery B2 is charged with the regenerative power output from the driving motor M to the first power lines 21p and 21n during deceleration, the converter ECU 73 operates the voltage converter 5 so as to exert a buck function in the voltage converter 5. The buck function refers to a function to buck power in the first power lines 21p and 21n connected with the high voltage side terminals 57p and 57n to output the bucked power to the second power lines 31p and 31n connected with the low voltage side terminals 56p and 56n, thereby making a negative passing current flow from the side of the first power lines 21p and 21n to the side of the second power lines 31p and 31n.

Referring to FIG. 1 again, the first battery ECU 74 is a computer mainly responsible for monitoring the state of the first battery B1 and for on/off operation of the contactors 22p and 22n of the first power circuit 2. The first battery ECU 74 calculates various parameters representing the internal state of the first battery B1, more specifically, the temperature of the first battery B1, the internal resistance of the first battery B1, the static voltage of the first battery B1, the closed circuit voltage of the first battery B1, the deterioration upper limit voltage of the first battery B1, the deterioration lower limit voltage of the first battery B1, and the charging rate of the first battery B1, etc., based on the conventional algorithms using the detected values transmitted from the first battery sensor unit 81. The information relating to the parameters representing the internal state of the first battery B1 obtained in the first battery ECU 74 is, for example, transmitted to the management ECU 71.

The second battery ECU 75 is a computer mainly responsible for monitoring the state of the second battery B2 and for on/off operation of the contactors 32p and 32n of the second power circuit 3. The second battery ECU 75 calculates various parameters representing the internal state of the second battery B2, more specifically, the temperature of the second battery B2, the internal resistance of the second battery B2, the static voltage of the second battery B2, the closed circuit voltage of the second battery B2, and the charging rate of the second battery B2, etc., based on the conventional algorithms using the detected values transmitted from the second battery sensor unit 82. The information relating to the parameters representing the internal state of the second battery B2 obtained in the second battery ECU 75 is, for example, transmitted to the management ECU 71.

The management ECU 71 is a computer mainly managing power flow in the entire power system 1. The management ECU 71 generates a torque command signal equivalent to a command with respect to a torque generated by the driving motor M and a passing power command signal equivalent to a command equivalent to a command with respect to power passing through the voltage converter 5 by executing a power management process described in the following with reference to FIG. 4.

The motor ECU 72 is a computer mainly managing power flow from the first power circuit 2 to the driving motor M. The motor ECU 72 operates the power converter 43 based on the torque command signal transmitted from the management ECU 71, so as to generate a torque responsive to the command in the driving motor M.

The converter ECU 73 is a computer mainly managing flow of passing power which is the power passing through the voltage converter 5. The converter ECU 73 operates the voltage converter 5 responsive to the passing power command signal transmitted from the management ECU 71, so that passing power responsive to the command passes through the voltage converter 5. More specifically, the converter ECU 73 calculates a target current, which is the target with respect to the passing current in the voltage converter 5, based on the passing power command signal, and operates the voltage converter 5 in accordance with a conventional feedback control algorithm, so that the passing current detected by the current sensor 33 (referred to as "actual passing current" in the following) becomes the target current.

Figure 4:
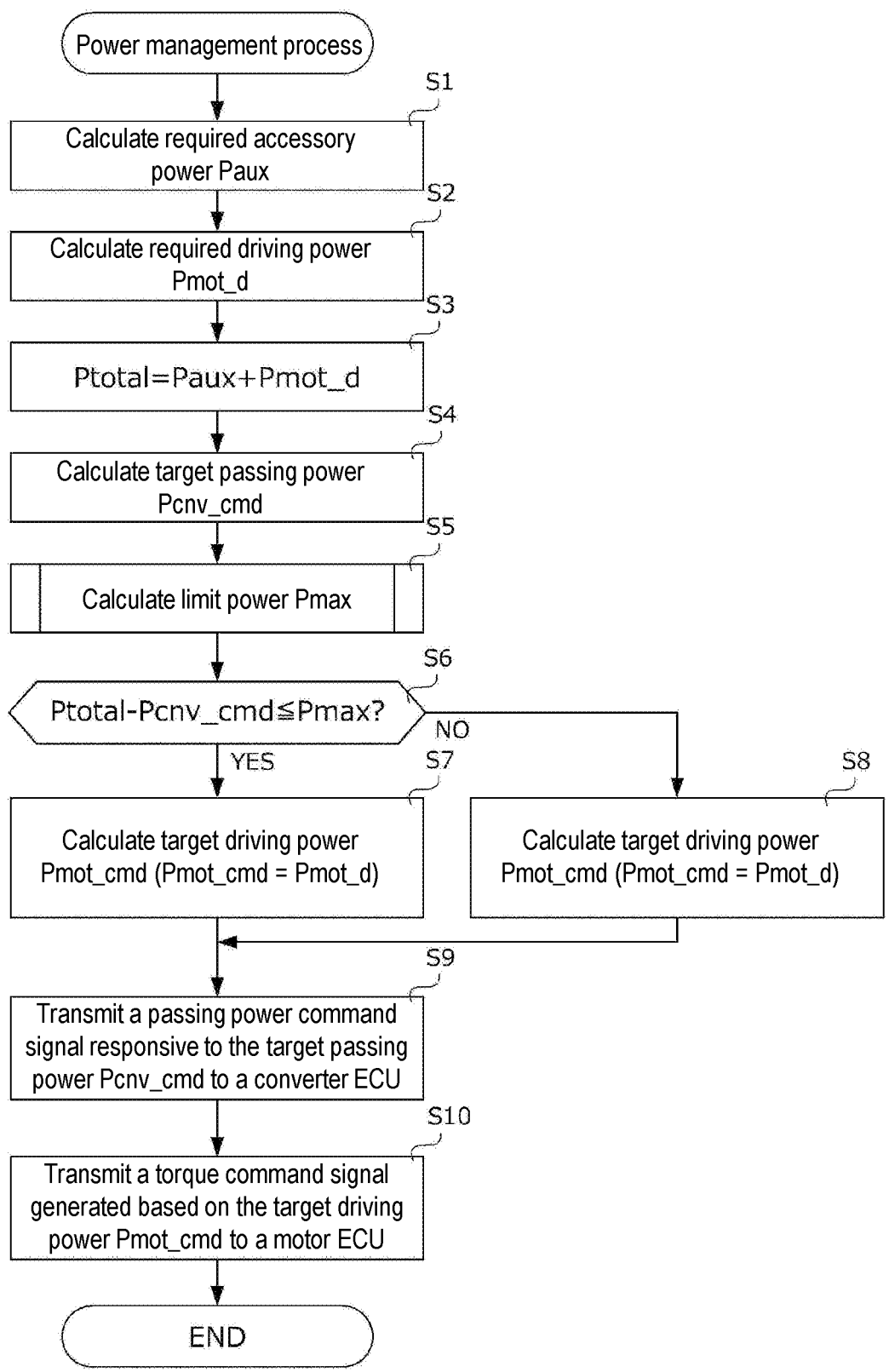
FIG. 4 is a flowchart illustrating specific steps of a power management process.

FIG. 4 is a flowchart illustrating specific steps of the power management process. The power management process is executed repetitively at a predetermined period in the management ECU 71.

Firstly, at S1, the management ECU calculates required accessory power Paux, which is power required in the vehicle accessory 42, and proceeds to S2. The management ECU 71 calculates the required accessory power Paux based on the information relating to the operating states of the various electrical loads transmitted from the vehicle accessory 42.

Then, at S2, the management ECU 71 calculates required driving power Pmot_d, which is power required in the driving motor M, and proceeds to S3. The management ECU 71 calculates a required driving torque of a driver based on an operation amount of a pedal type P (referring to FIG. 1), such as an accelerator pedal or a brake pedal, etc., by the driver, and calculates the required driving power Pmot_d by converting the required driving torque into power. Accordingly, in the embodiment, a required power obtaining section is formed by the pedal type P and the management ECU 71.

Then, at S3, the management ECU 71 calculates total required power Ptotal by adding up the required accessory power Paux and the required driving power Pmot_d and proceeds to S4.

Then, at S4, the management ECU 71 calculates target passing power Pcnv_cmd equivalent to the target with respect to the passing power in the voltage converter 5 and proceeds to S5. The management ECU 71 calculates the target passing power Pcnv_cmd based on the information relating to parameters representing the internal state of the first battery B1 that is transmitted from the first battery ECU 74 and the information relating to parameters representing the internal state of the second battery B2 transmitted from the second battery ECU 75. That is, the management ECU 75 sets the target passing power Pcnv_cmd as a positive predetermined value and power is output from the second battery B2 in the case where, for example, during acceleration, the output of power from the second battery B2 is required and the charging rate of the second battery B2 is sufficient. In addition, the management ECU 71 sets the target passing power Pcmv_cmd as a negative predetermined value and a portion of the power in the first power circuit 2 is supplied to the second battery B2 in the case where, for example, the charging rate of the second battery B2 is low and charging of the second battery B2 is required. In addition, the management ECU 71 sets the target passing power Pcnv_cmd as 0 and prohibits charging and discharging of the second battery B2 in, for example, the case where the temperature of the second battery B2 is higher than the high-temperature power save temperature described afterwards or the case where the charging rate of the second battery B2 is insufficient, etc.

Then, at S5, the management ECU 71 calculates a limit power Pmax which is the upper limit with respect to the output power of the first battery B1 and proceeds to S6. The specific steps for calculating the limit power Pmax will be described afterwards with reference to FIG. 5.

Then, at S6, the management ECU 71 determines whether the power obtained by subtracting the target passing power Pcnv_cmd from the total required power Ptotal is equal to or less than the limit power Pmax. Here, the power obtained by subtracting the target passing power Pcnv_cmd from the total required power Ptotal is equivalent to the requirement on the output power of the first battery B1. Therefore, the determination at S6 is equivalent to determination on whether the output power of the first battery B1 can satisfy the requirement of the driver without exceeding the limit power Pmax. The management ECU 71 proceeds to S7 in the case where the determination result of S6 is YES, and proceeds to S8 in the case of NO.

At S7, the management ECU calculates target driving power Pmot_cmd equivalent to the target with respect to the power supplied from the first power circuit 2 to the driving motor M via the power converter 43 and proceeds to S9. In the case where the determination result of S6 is YES as the above, since the output power of the first battery B1 can satisfy the requirement of the driver without exceeding the limit power Pmax, the management ECU 71 sets the required driving power Pmot_d calculated in S2 as the target driving power Pmot_cmd.

At S8, the management ECU 71 calculates the target driving power Pmot_cmd and proceeds to S9. In the case where the determination result of S6 is NO as the above, since the output power of the first battery B1 exceeds the limit power Pmax if the requirement of the driver is to be satisfied, the management ECU 71 calculates the target driving power Pmot_cmd so that the output power of the first battery B1 does not exceed the limit power Pmax. More specifically, the management ECU 71, for example, calculates the target driving power Pmot_cmd by subtracting the required accessory power Paux from the sum of the limit power Pmax and the target passing power Pcnv_cmd. Accordingly, the output power of the first battery B1 becomes the limit power Pmax and does not exceed the limit power Pmax.

Then, at S9, the management ECU 71 generates the passing power command signal responsive to the target passing power Pcnv_cmd calculated at S4, transmits the passing power command signal to the converter 73, and proceeds to S10. The converter ECU 73 operates the voltage converter 5 based on the passing power command signal. Accordingly, the power responsive to the target passing power Pcnv_cmd is output from the second battery B2 to the first power circuit 2.

Then, at S10, the management ECU 71 generates the torque command signal based on the target driving power Pmot_cmd, transmits the torque command signal to the motor ECU 72, and ends the power management process. More specifically, the management ECU 71 calculates a target driving torque by converting the target driving power Pmot_cmd into a torque, and generates the torque command signal responsive to the target driving torque. The motor ECU 72 operates the power converter 43 based on the torque command signal. Accordingly, the power responsive to the target driving power Pmot_cmd is output from the first power circuit 2 to the driving motor M. In this way, in the management ECU 71, by generating the torque command signal based on the target driving power Pmot_cmd calculated through the process in S7 or S8, the power output from the first battery B1 does not exceed the limit power Pmax. Accordingly, in the embodiment, a power control section is formed by the management ECU 71, the motor ECU 72, and the converter ECU 73.

Figure 5:
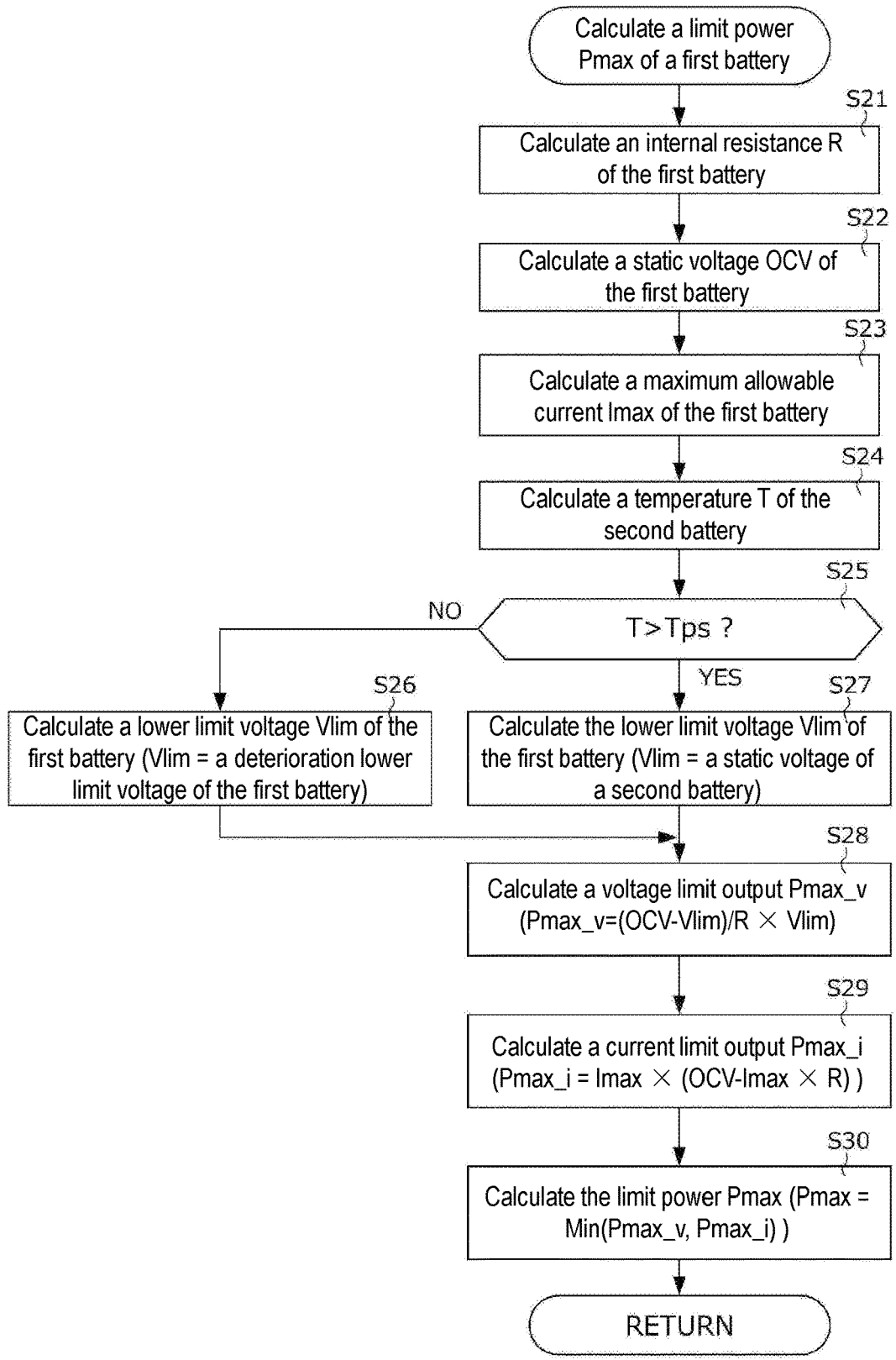
FIG. 5 is a flowchart illustrating specific steps for calculating a limit power with respect to a first battery.

FIG. 5 is a flowchart illustrating specific steps for calculating the limit power Pmax with respect to the first battery B1 by the management ECU 71.

At S21, the management ECU 71 calculates an internal resistance R of the first battery B1 based on the information relating to the internal state of the first battery B1 that is transmitted from the first battery ECU 74 and proceeds to S22.

At S22, the management ECU 71 calculates a static voltage OCV of the first battery B1 based on the information relating to the internal state of the first battery B1 that is transmitted from the first battery ECU 74 and proceeds to S23.

At S23, the management ECU 71 calculates a maximum allowable current Imax of the first battery B1 based on the information relating to the internal state of the first battery B1 that is transmitted from the first battery ECU 74 and proceeds to S24. The maximum allowable current is the maximum value of the allowable range for a current flowing through the first battery B1. That is, when a current flowing through the first battery B1 exceeds the maximum allowable current Imax, there are concerns that the first battery B1 may deteriorate.

At S24, the management ECU 71 calculates a temperature T of the second battery B2 based on the information relating to the internal state of the second battery B2 that is transmitted from the second battery ECU 75 and proceeds to S25. Accordingly, in the embodiment, a state obtaining section is formed by the second battery sensor unit 82, the second battery ECU 75, and the management ECU 71.

At S25, the management ECU 71 determines whether the temperature T of the second battery B is higher than a predetermined high-temperature power save temperature Tps. When a normal battery is charged and discharged in a state where the temperature is excessively high, the concerns of deterioration may arise. Therefore, in the case where the temperature T of the second battery B2 is higher than the high-temperature power save temperature Tps, in order to prevent the second battery B2 from deterioration, it is necessary to prohibit charging and discharging of the second battery B2. Therefore, as described above, the management ECU 71 sets the target passing power Pcnv_cmd as 0 and prohibits charging and discharging of the second battery B2 (referring to S4 of FIG. 4) in the case where the temperature T of the second battery B2 is higher than the high-temperature power save temperature Tps.

In the case where the determination result of S25 is NO, the management ECU 71 proceeds to S26. In S26, the management ECU 71 calculates a lower limit voltage Vlim equivalent to the lower limit with respect to the closed circuit voltage of the first battery B1 and proceeds to S28. Here, the case where the determination result of S25 is NO is equivalent to the case where the temperature T of the second battery B2 is equal to or lower than the high-temperature power save temperature Tps, that is, equivalent to the case where it is not necessary to prohibit charging and discharging of the second battery B2. Accordingly at S26, the management ECU 71 calculates the deterioration lower limit voltage with respect to the closed circuit voltage of the first battery B1 based on the information relating to the internal state of the first battery B1 that is transmitted from the first battery ECU 74, and sets the deterioration lower limit voltage as the lower limit voltage Vlim.

Then, at S28, the management ECU 71 calculates a voltage limit output Pmax_v of the first battery B1 and proceeds to S29. Here, the voltage limit output Pmax_v is equivalent to one obtained by setting the upper limit with respect to the output power of the first battery B1 based on the lower limit voltage. That is, the management ECU 71 calculates the voltage limit output Pmax_v so that the closed circuit voltage of the first battery B1 becomes equal to or higher than the lower limit voltage Vlim. Therefore, the management ECU 71 calculates the voltage limit output Pmax_v according to the following equation (1) based on the internal resistance R of the first battery B1, the static voltage OCV of the first battery B1, and the lower limit voltage Vlim.

$$P\max\_v = (OCV - V\lim)/R \times V\lim \quad (1)$$

Then, at S28, the management ECU 71 calculates a current limit output Pmax_i and proceeds to S30. Here, the current limit output Pmax_i is equivalent to one obtained by setting the upper limit with respect to the output power of the first battery B1 based on the maximum allowable current Imax. That is, the management ECU 71 calculates the current limit output Pmax_i so that the current flowing through the first battery B1 becomes equal to or less than the maximum allowable current Imax. Therefore, the management ECU 71 calculates the voltage limit output Pmax_v according to the following equation (2) based on the internal resistance R, the static voltage OCV of the first battery B1, and the maximum allowable current Imax.

$$Pmax\_i = Imax \times (OCV - Imax \times R) \quad (2)$$

At S30, the management ECU 71 calculates the limit power Pmax based on the voltage limit output Pmax_v and the current limit output Pmax_i and proceeds to S6 of FIG. 4. More specifically, the management ECU 71 sets the smaller one of the voltage limit output Pmax_v and the current limit output Pmax_i as the limit power Pmax according to the following equation (3). By calculating the limit power Pmax in this way, the output power of the first battery B1 can be set equal to or lower than the voltage limit output Pmax_v and the current limit output Pmax_i, the closed circuit voltage of the first battery B1 can be set equal to or higher than the lower limit voltage Vlim, and the current flowing through the first battery B1 can be set equal to or lower than the maximum allowable current Imax.

$$Pmax = Min(Pmax\_v, Pmax\_i) \quad (3)$$

In addition, in the case where the determination result of S25 is YES, the management ECU 71 proceeds to S27. At S27, the management ECU 71 calculates the lower limit voltage Vlim of the first battery B1 and proceeds to S28. Here, the case where the determination result of S25 is YES is equivalent to the case where the temperature T of the second battery B2 is higher than the high-temperature power save temperature Tps, that is, equivalent to the case where it is necessary to prohibit charging and discharging of the second battery B2. However, as described with reference to FIG. 3, since the voltage converter 5 includes the freewheel diode which sets the direction from the side of the second power circuit 3 to the side of the first power circuit 2 as the forward direction, when the voltages of the first power lines 21p and 21n, that is, the closed circuit voltage of the first battery B1, are lower than the voltages of the second power lines 31p and 31n, that is, the static voltage of the second battery B2, the second battery B2 starts to discharge, and a positive passing current flows via the freewheel diode. Here, at S27, the management ECU 71 calculates the static voltage of the second battery B2 based on the information relating to the internal state of the second battery B2 that is transmitted from the second battery ECU 75, and sets the static voltage as the lower limit voltage Vlim. Accordingly, the management ECU 71 can calculate the limit power Pmax, so that the closed circuit voltage of the first battery B1 is equal to or higher than the static voltage of the second battery B2, in the case where the temperature T of the second battery B2 is higher than the high-temperature power save temperature Tps.

Figure 6:
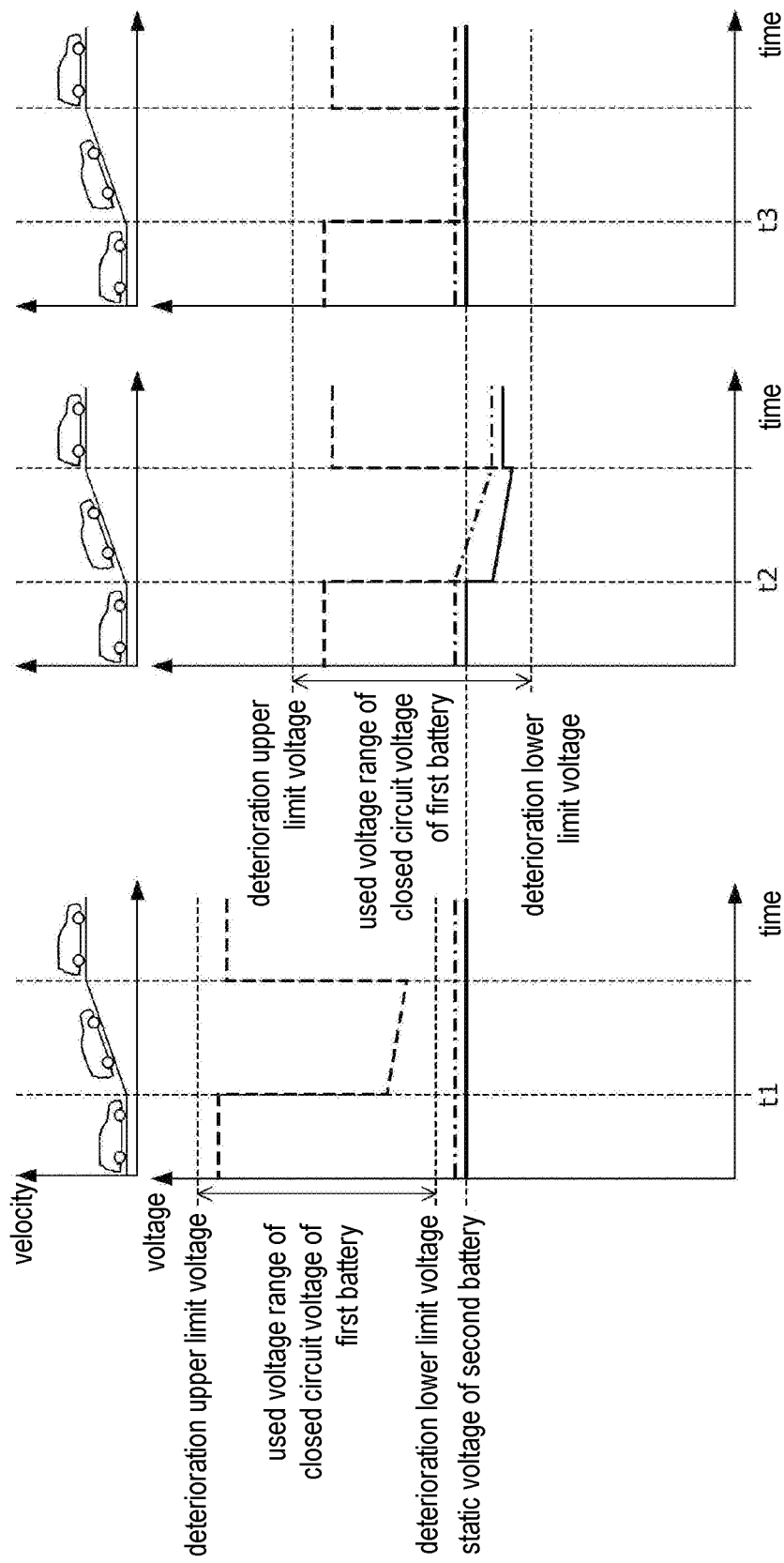
FIG. 6 is a timing chart illustrating changes of a voltage of the first battery, a voltage of a second battery, and a charging rate of the second battery during acceleration in a state in which the temperature of the second battery is higher than a high-temperature power save temperature.

In the following, the effect of the power system 1 according to the embodiment is described with reference to FIG. 6. FIG. 6 is a timing chart illustrating changes of the voltage of the first battery B1 (bold broken line), the voltage of the second battery B2 (bold solid line), and the charging rate of the second battery B2 (bold dash-dot line) during acceleration in the state in which the temperature of the second battery B2 is higher than the high-temperature power save temperature. The left side of FIG. 6 shows the case where the static voltage of the second battery B2 is lower than the deterioration lower limit voltage of the first battery B1, and the middle and the right side show the case where the static voltage of the second battery B2 is higher than the deterioration lower limit voltage of the first battery B1. In addition, the right side of FIG. 6 shows the case where the limit power Pmax is set in accordance with the flowchart of FIG. 5, and the middle of FIG. 6 shows a comparative example where the lower limit voltage Vlim of the first battery B1 is constantly set as the deterioration lower limit voltage of the first battery B1.

As shown on the left side of FIG. 6, when the required driving power is increased from 0 to the positive predetermined value by the driver stepping on the accelerator pedal at a time t1, the closed circuit voltage of the first battery B1 is decreased by outputting power responsive to the requirement from the first battery B1. However, in the example on the left side of FIG. 6, the deterioration lower limit voltage of the first battery B1 is higher than the static voltage of the second battery B2, so the closed circuit voltage of the first battery B1 is constantly maintained higher than the static voltage of the second battery B2. Accordingly, since no power is output from the second battery B2, the voltage thereof is maintained at the static voltage, and the charging rate thereof is also maintained at a fixed level.

Then, as shown in the middle of FIG. 6, in the comparative example, since the lower limit voltage Vlim of the first battery B1 is constantly set as the deterioration lower limit voltage, when the driver steps on the accelerator pedal at a time t2, the closed circuit voltage of the first battery B1 may be lower than the static voltage of the second battery B2. Therefore, in the comparative example, the second battery B2 may start to discharge after the time t2 in spite of the state of intending to prohibit charging and discharging of the second battery B2.

Regarding this, as shown on the right side of FIG. 6, in the flowchart of FIG. 5, in the case in which the temperature of the second battery B2 is higher than the high-temperature power save temperature, the static voltage of the second battery B2 higher than the deterioration lower limit voltage of the first battery B1 is set as the lower limit voltage Vlim of the first battery B1. Therefore, even if the driver steps on the accelerator pedal at a time t3, since the closed circuit voltage of the first battery B1 does not go lower than the static voltage of the second battery B2, the second battery B2 does not start to discharge.

According to the power system 1 according to the embodiment as described above, the following effects are achieved. (1) In the power system 1 according to the embodiment, the second battery ECU 75 and the second battery sensor unit 82 obtain the state of the second battery B2, the management ECU 71 calculates the limit power Pmax with respect to the output power of the first battery B1 based on the state of the second battery B2, and the motor ECU 72 operates the power converter 43 so that the output power of the first battery B1 does not exceed the limit power Pmax. Thus, according to the power system 1, since the power output from the first battery B1 can be limited in response to the state of the second battery B2, the unintentional discharging of the second battery B2 can be suppressed.

(2) In the power system 1 according to the embodiment, the management ECU 71 calculates the limit power Pmax, so that the closed circuit voltage of the first battery B1 is equal to or higher than the static voltage of the second battery B2, in the case where the temperature T of the second battery B2 is higher than the high-temperature power save temperature Tps. Accordingly, in the case where the temperature T of the second battery B2 is higher than the high-temperature power save temperature Tps, since the output power of the first battery B1 is limited so that the closed circuit voltage of the first battery B1 is equal to or higher than the static voltage of the second battery B2, the deterioration of the second battery B2 can be suppressed.

Second Embodiment

Then, regarding the power system according to the second embodiment of the disclosure, the descriptions are made together with reference to the drawings. The power system according to the embodiment differs from the power system according to the first embodiment in that the steps for calculating the limit power Pmax with respect to the first battery are different. In the following, regarding the power system according to the embodiment, the different configuration from the power system 1 according to the first embodiment is described.

Figure 7A:
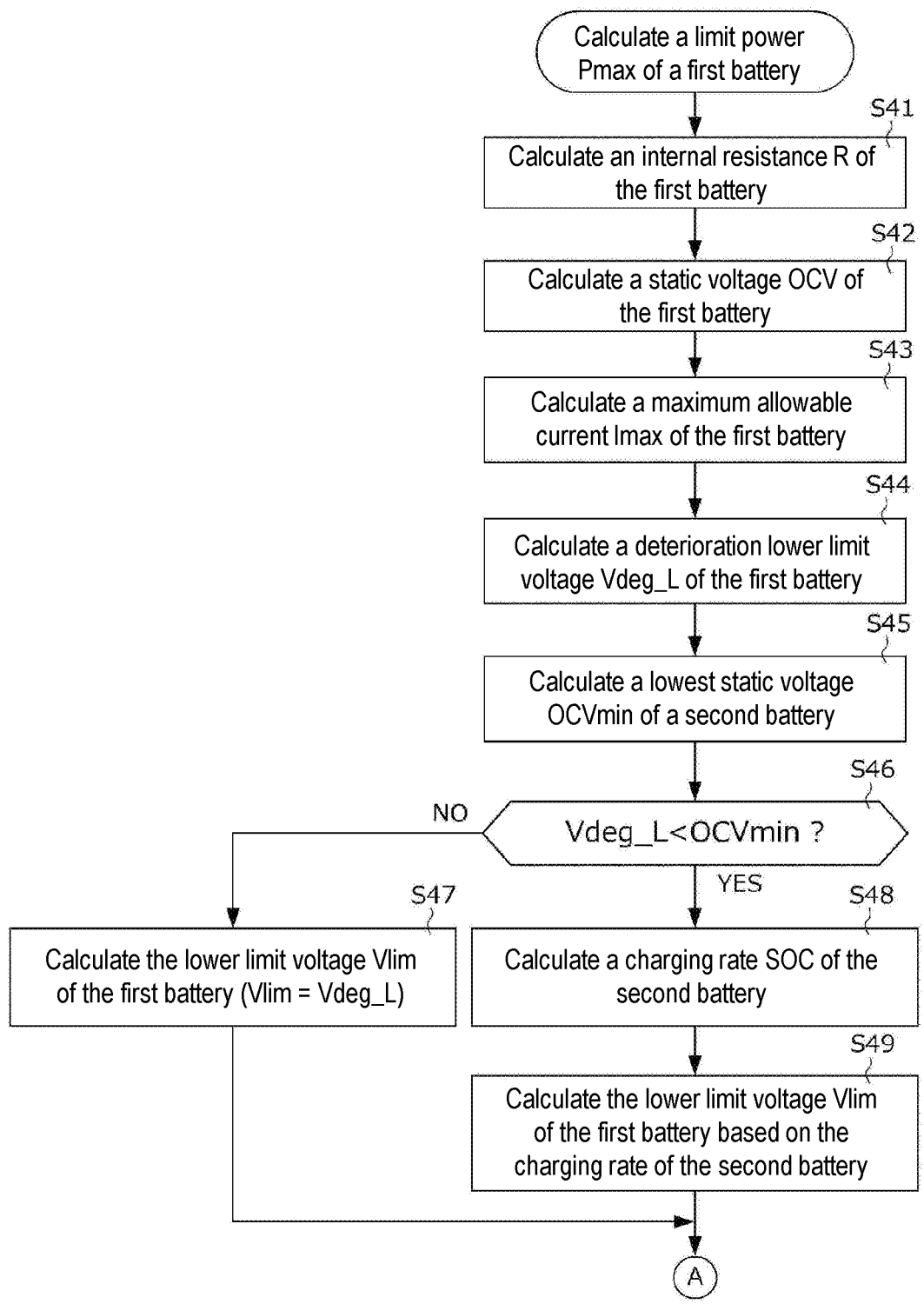
FIG. 7A is a flowchart illustrating steps for calculating a limit power with respect to a first battery in a power system according to a second embodiment of the disclosure (first).
Figure 7B:
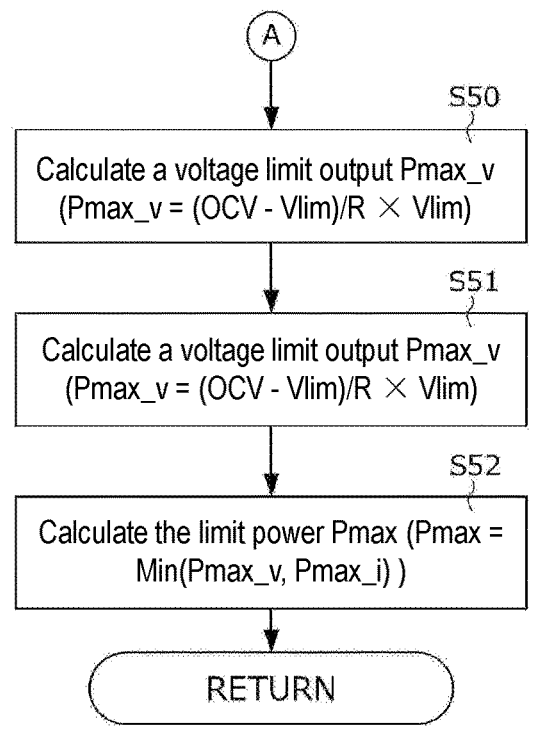
FIG. 7B is a flowchart illustrating steps for calculating the limit power with respect to the first battery in the power system according to the second embodiment of the disclosure (second).

FIGS. 7A and 7B are flowcharts illustrating the steps for calculating the limit power Pmax with respect to the first battery B1 by the management ECU 71 of the power system according to the embodiment. In the flowcharts of FIGS. 7A and 7B, the processes of S41 to S43 and S50 to S52 are respectively the same as the processes of S21 to S23 and S28 to S30, so the descriptions thereof will be omitted.

At S44, the management ECU 71 calculates a deterioration lower limit voltage Vdeg_L, which is the lower limit of the used voltage range with respect to the closed circuit voltage of the first battery B1 based on the information relating to the internal state of the first battery B1 that is transmitted from the first battery ECU 74, and proceeds to S45.

At S45, the management ECU 71 calculates a lowest static voltage OCVmin of the second battery B2 and proceeds to S46. Here, the lowest static voltage OCVmin is the lower limit with respect to the second battery B2, and is equivalent to the static voltage of the second battery B2 when the charging rate of the second battery B2 is at the predetermined lower limit. Therefore, if the static voltage of the second battery B2 is maintained higher than the lowest static voltage OCVmin, the charging rate can be ensured to be higher than the lower limit in the second battery B2.

At S46, the management ECU 71 determines whether the deterioration lower limit voltage Vdeg_L of the first battery B1 is lower than the lowest static voltage OCVmin of the second battery B2. The management ECU 71 proceeds to S47 in the case where the determination result of S46 is NO, and proceeds to S48 in the case of YES.

In S47, the management ECU 71 sets the deterioration lower limit voltage Vdeg_L of the first battery B1 as the lower limit voltage Vlim and proceeds to S50. Here, in the case where the determination result of S46 is NO, the deterioration lower limit voltage Vdeg_L is equal to or higher than the lowest static voltage OCVmin. Therefore, even if the deterioration lower limit voltage Vdeg_L of the first battery B1 is set as the lower limit voltage Vlim, the closed circuit voltage of the first battery B1 does not go lower than the lowest static voltage OCVmin of the second battery B2.

At S48, the management ECU 71 calculates a charging rate SOC of the second battery B2 based on the information relating to the internal state of the second battery B2 that is transmitted from the second battery ECU 75 and proceeds to S49. Accordingly, in the embodiment, a state obtaining section is formed by the second battery sensor unit 82, the second battery ECU 75, and the management ECU 71.

In S49, the management ECU 71 sets the lower limit voltage Vlim of the first battery B1 based on the charging rate SOC of the second battery B2 and proceeds to S50. Here, in the case where the determination result of S46 is YES, the deterioration lower limit voltage Vdeg_L is lower than the lowest static voltage OCVmin. Therefore, when the deterioration lower limit voltage Vdeg_L of the first battery B1 is set as the lower limit voltage Vlim, there are concerns that the closed circuit voltage of the first battery B1 may go lower than the lowest static voltage of the second battery B2 and the second battery B2 may start to discharge. Therefore, in the case where the charging rate SOC of the second battery B2 is insufficient, there are concerns that the charging rate SOC of the second battery B2 may go lower than the lower limit thereof. Therefore, while it can also be considered to set the lowest static voltage OCVmin of the second battery B2 as the lower limit voltage Vlim, there are concerns that, by doing so, the discharging of the first battery B1 and the second battery B2 may be excessively limited and the requirement from the driver cannot be sufficiently coped with. Here, at S49, the management ECU 71 calculates the lower limit voltage Vlim between the deterioration lower limit voltage Vdeg_L and the lowest static voltage OCVmin based on the charging rate SOC of the second battery B2.

Figure 8:
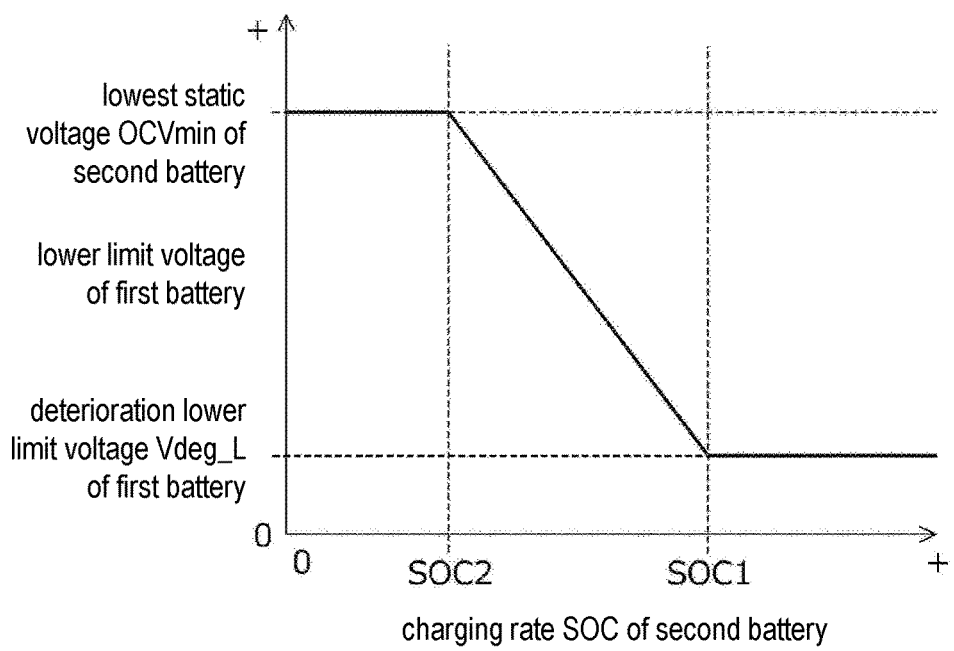
FIG. 8 is a diagram illustrating mapping for setting a lower limit voltage based on a charging rate of a second battery.

More specifically, the management ECU 71 calculates the lower limit voltage Vlim by searching the mapping shown in FIG. 8 based on the charging rate SOC of the second battery B2. In the example of FIG. 8, in the case where the charging rate SOC of the second battery B2 is higher than a first threshold SOC1, the management ECU 71 sets the deterioration lower limit voltage Vdeg_L of the first battery B1 as the lower limit Vlim of the first battery B1, and in the case where the charging rate SOC of the second battery B2 is lower than a second threshold SOC2 smaller than the first threshold SOC1, the management ECU 71 sets the lowest static voltage OCVmin of the second battery B2 as the lower limit voltage Vlim of the first battery B1. In addition, in the case where the charging rate SOC of the second battery B2 is equal to or lower than the first threshold SOC1 and higher than the second threshold SOC2, the management ECU 71 sets the lower limit voltage Vlim to be higher when the charging rate SOC is smaller between the deterioration lower limit voltage Vdeg_L of the first battery B1 and the lowest static voltage OCVmin of the second battery B2. Accordingly, the lower limit voltage Vlim is set to be higher in the case where the charging rate SOC of the second battery B2 is equal to or lower than the first threshold SOC1 or the second threshold SOC2 than the case where the charging rate SOC is higher than the first threshold SOC1 or the second threshold SOC2. Therefore, through the processes of S50 to S52, the voltage limit power Pmax_v and the limit power Pmax are set to be smaller in the case where the charging rate SOC of the second battery B2 is equal to or lower than the first threshold SOC1 or the second threshold SOC2 than the case where the charging rate SOC is greater than or equal to the first threshold SOC1 or the second SOC2.

(3) According to the power system according to the embodiment as described above, the following effects are achieved. In the power system according to the embodiment, the management ECU 71 calculates the voltage limit output Pmax_v and the limit power Pmax to be smaller in the case where the charging rate SOC of the second battery B2 is equal to or lower than the first threshold SOC1 or the second threshold SOC2 than the case where the charging rate SOC is greater than the first threshold SOC1 or the second threshold SOC2. In other words, the management ECU 71 reduces the voltage limit power Pmax_v and the limit power Pmax in accordance with the decrease in the charging rate of the second battery B2. Therefore, according to the power system, in the case where the charging rate SOC of the second battery B2 is sufficient, the power output from the first battery B1 and the power output from the second battery B2 can be combined, and the power responsive to the required power can be supplied to the driving motor M, and in the case where the charging rate SOC of the second battery B2 is insufficient, the decrease in the charging rate SOC of the second battery B2 can be suppressed.

(4) In the power system according to the embodiment, the management ECU 71 calculates the voltage limit power Pmax_v and the limit power Pmax so that the closed circuit voltage of the first battery B1 is equal to or higher than the predetermined lower limit voltage Vlim, and, in the case where the charging rate SOC of the second battery B2 is higher than the first threshold SOC1, sets the deterioration lower limit voltage Vdeg_L, which is the lower limit of the used voltage range with respect to the closed circuit voltage of the first battery B1, as the lower limit voltage Vlim. Accordingly, in the case where the charging rate SOC of the second battery B2 is sufficient, since the outputs of the power from the first battery B1 and the second battery B2 can be allowed, the power responsive to the required power can be provided to the driving motor M. In addition, in the case where the charging rate SOC of the second battery B2 is equal to or less than the second threshold SOC2, the management ECU 71 sets the lowest static voltage OCVmin, which is the static voltage of the second battery B2 when the static voltage is higher than the deterioration lower limit voltage Vdeg_L of the first battery B1 and the charging rate SOC of the second battery B2 is at the predetermined lower limit, as the lower limit voltage. Accordingly, in the case where the charging rate SOC of the second battery B2 is insufficient, the output of power of the second battery B2 can be suppressed and the charging rate SOC can be prevented from going lower than the lower limit.

What is claimed is:

1. A power system, comprising: a high voltage circuit, having a high voltage power source;
   a low voltage circuit, having a low voltage power source, wherein a used voltage range of the low voltage power source with respect to a closed circuit voltage overlaps with the high voltage power source, and a static voltage of the low voltage power source is lower than the high voltage power source;
   a voltage converter, converting a voltage between the high voltage circuit and the low voltage circuit;
   a power converter, converting power between the high voltage circuit and a driving motor;
   a required power obtaining section, obtaining required power in the driving motor;
   a power control section, operating the power converter based on the required power; and
   a state obtaining section, obtaining a state of the low voltage power source,
   wherein the power control section calculates a limit power, which is an upper limit with respect to output power of the high voltage power source, based on a state of the low voltage power source, and operates the power converter so that the output power of the high voltage power source does not exceed the limit power.

2. The power system as claimed in claim 1, wherein the state obtaining section obtains a temperature of the low voltage power source, and in a case where the temperature of the low voltage power source is higher than a predetermined temperature, the power control section calculates the limit power so that a closed circuit voltage of the high voltage power source is equal to or higher than the static voltage of the low voltage power source.

3. The power system as claimed in claim 1, wherein the low voltage power source is a power storage device capable of charging and discharging, the state obtaining section obtains a power storage parameter that increases in response to a power storage of the low voltage power source, and the power control section calculates the limit power so as to be smaller in a case where the power storage parameter is less than or equal to a predetermined threshold than in a case where the power storage parameter is greater than the predetermined threshold.

4. The power system as claimed in claim 3, wherein the power control section calculates the limit power, so that a closed circuit voltage of the high voltage power source is equal to or higher than a predetermined lower limit voltage, sets a lower limit of a used voltage range of the high voltage power source as the lower limit voltage in a case where the power storage parameter is greater than a first threshold, and sets a lowest voltage, which is a static voltage of the low voltage power source when the power storage of the low voltage power source is at a predetermined lower limit, as the lower limit voltage in a case where the power storage parameter is equal to or lower than a second threshold smaller than the first threshold, and the lowest voltage is higher than the lower limit of the used voltage range of the high voltage power source.

\* \* \* \* \*